US006287455B1

(12) United States Patent
Whitmore

(10) Patent No.: US 6,287,455 B1
(45) Date of Patent: Sep. 11, 2001

(54) PURIFIER FOR LUBRICATING OIL OR HYDRAULIC OIL

(76) Inventor: C. Barclay Whitmore, 2510 Linden Tree St., Seffner, FL (US) 33584

( * ) Notice: Subject to any disclaimer, the term of this patent is extended or adjusted under 35 U.S.C. 154(b) by 0 days.

(21) Appl. No.: 09/080,335

(22) Filed: May 15, 1998

(51) Int. Cl.$^7$ .......................... C10M 175/02; B01D 1/22
(52) U.S. Cl. .......................... 208/179; 208/184; 208/187; 210/168; 210/180; 422/198; 422/199; 196/46; 196/98; 196/132; 159/44
(58) Field of Search ..................... 208/184, 179, 208/187; 196/46, 108, 132, 98; 159/901, 44; 422/198, 199, 173, 174; 210/168, 180

(56) References Cited

U.S. PATENT DOCUMENTS

| 4,093,548 | * | 6/1978 | Sterkenburg et al. | 210/180 |
| 4,146,475 | * | 3/1979 | Forsland | 210/71 |
| 4,272,371 | * | 6/1981 | Moses et al. | 210/168 |
| 4,295,966 | * | 10/1981 | LeBlanc et al. | 210/180 |
| 4,443,334 | * | 4/1984 | Shugarman et al. | 210/168 |
| 4,830,745 | * | 5/1989 | Van Der Meulen | 210/168 |
| 4,968,410 | * | 11/1990 | Johnson, Sr. | 208/187 |
| 5,630,956 | * | 5/1997 | Lynch | 210/180 |

* cited by examiner

Primary Examiner—Walter D. Griffin

(57) ABSTRACT

The present invention provides a means of removing water, antifreeze and fuel from lubricating or hydraulic oil by evaporating these impurities and venting them out of the purifier. The oil is heated by heat of an exposed horizontal heating wand within the evaporator. The oil then passes over the upper lip of the evaporator and cascades downward over the evaporator's ridged outer surface, thereby impeding the flow of oil and increasing the rate of evaporation of the impurities. The evaporated impurities then rise upward along the interior of the domed cover and are vented out of the purifier.

6 Claims, 3 Drawing Sheets

PURIFIER FOR LUBRICATING OIL OR HYDRAULIC OIL

BACKGROUND OF THE INVENTION

This invention relates to a device and method for treating oil used to lubricate an internal combustion engine, particularly for the removal of fluids as distinguished from particulate contaminants from oil. The oil purifier does not include a particulate filter which would increase the bulk of the purifier.

SUMMARY OF THE INVENTION

In the present invention, particulate contaminants are removed from oil by means of a filter (not shown) prior to the oil entering the purifier.

The oil purifier comprises a housing, an exposed horizontal heating wand located within a heating chamber, a cascading evaporator to increase the rate of evaporation of vaporizable impurities, and a vented domed cover to direct vaporized impurities outside the device. In use, the contaminated oil enters an inlet chamber and is channeled upwards through a flow regulator into the heating chamber. Oil is heated by the exposed horizontal heating wand. Impurities in the oil are vaporized, and consequently, fumes rise upwards towards the domed cover, pass through the vent in the cover and out of the purifier, while heated oil flows over a top lip of the heating chamber and flows downward over the ridges of the evaporator to cascade and increase the rate of evaporation of impurities from the heated oil.

Accordingly, an object of the present invention is to provide a highly efficient oil purifier for removing vaporizable impurities from oil used to lubricate an internal combustion engine or used to purify the oil in a hydraulic system.

Another object of this invention is to provide a highly efficient purifier having an evaporation chamber for removing vaporizable contaminants from lubricating oils and hydraulic oils.

Another object of this invention is to provide an evaporation chamber in an oil purifier which enables the flow of oil being treated to be regulated or controlled.

A still further object of this invention is to provide an oil purifier without a particulate filter included within the housing, but that contains a completely integrated heating element consisting of a fully exposed, horizontal heating wand that contributes a uniformity in heating and oil flow with respect to oil within the heating chamber.

It is still a further object of this invention to provide an oil purifier without a particulate filter included within the housing of the purifier so that vaporization of volatile contaminants can be accomplished separately from particulate removal.

A still further object of this invention is to provide a method and device for purifying oil used to lubricate an internal combustion engine wherein virtually all oil is exposed to a substantially uniform evaporation system.

BRIEF DESCRIPTION OF THE DRAWING

Other objects of the invention will appear in the following description and the appended claims, reference being made to the accompanying drawing forming a part of the specification wherein like reference characters designate corresponding parts in the several views.

DESCRIPTION OF THE PREFERRED EMBODIMENTS

Figure 1:
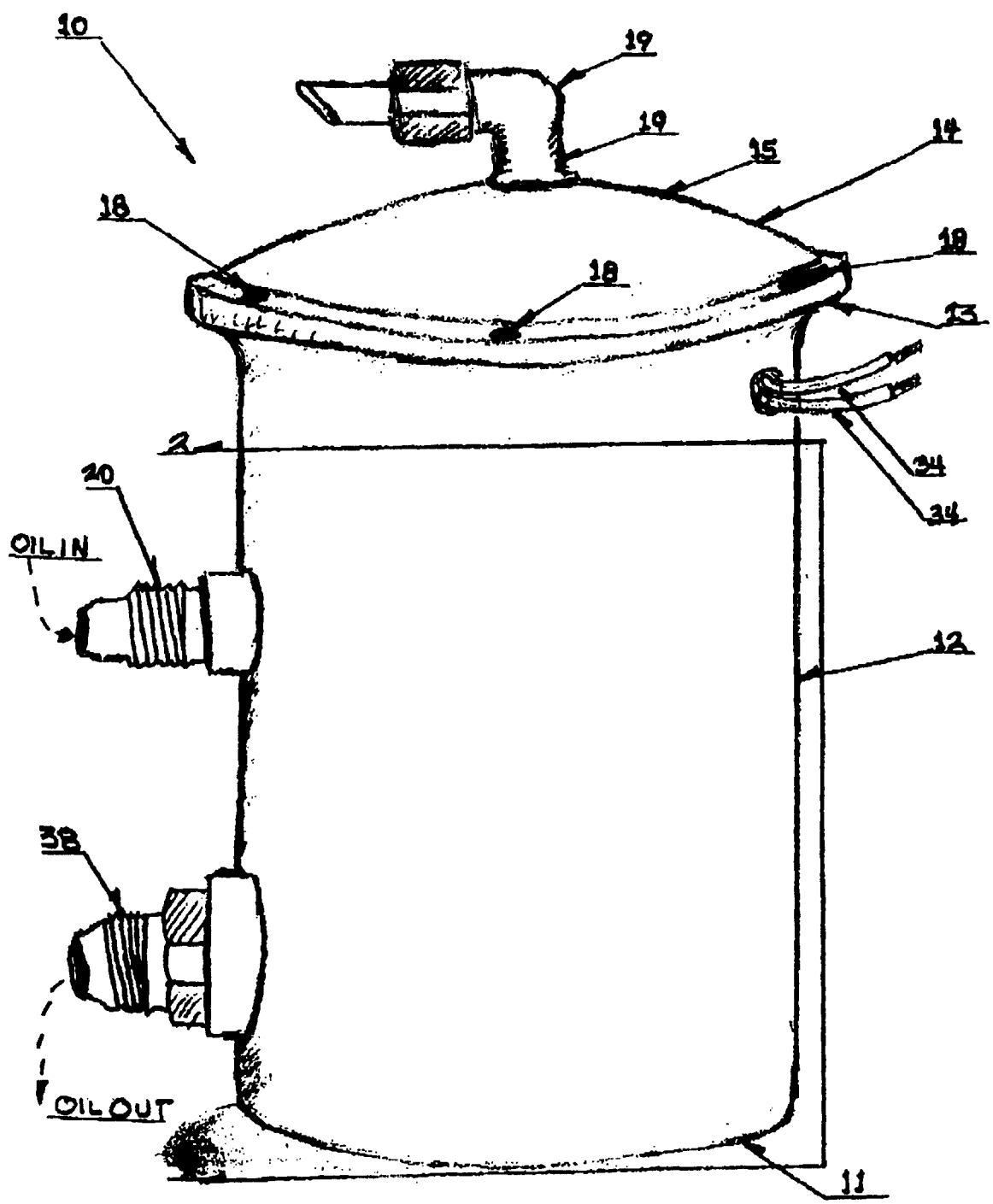
FIG. 1 is a plain side view of the entire device.
Figure 2:
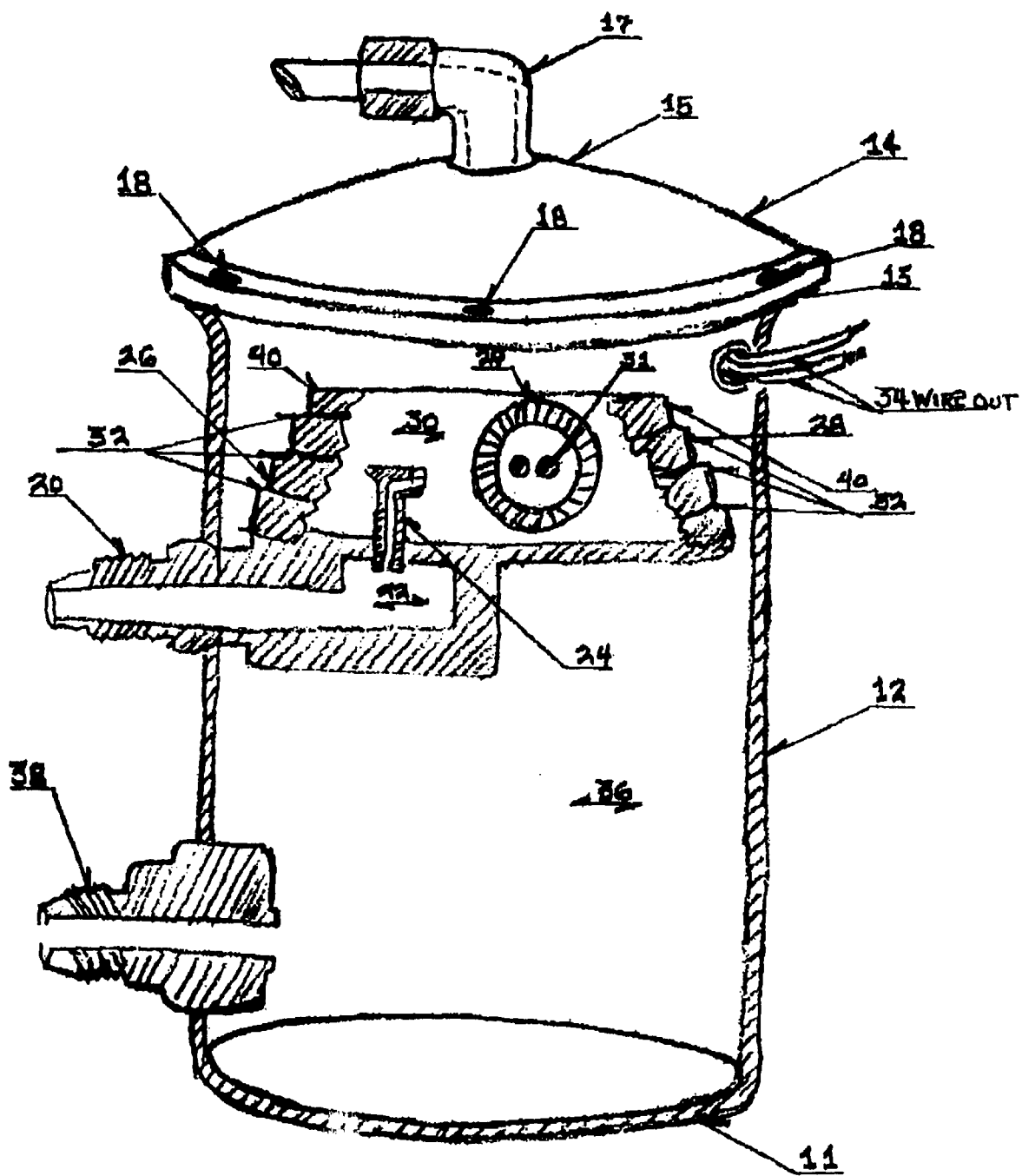
FIG. 2 is a vertical sectional view along line 2—2 of FIG. 1.
Figure 3:
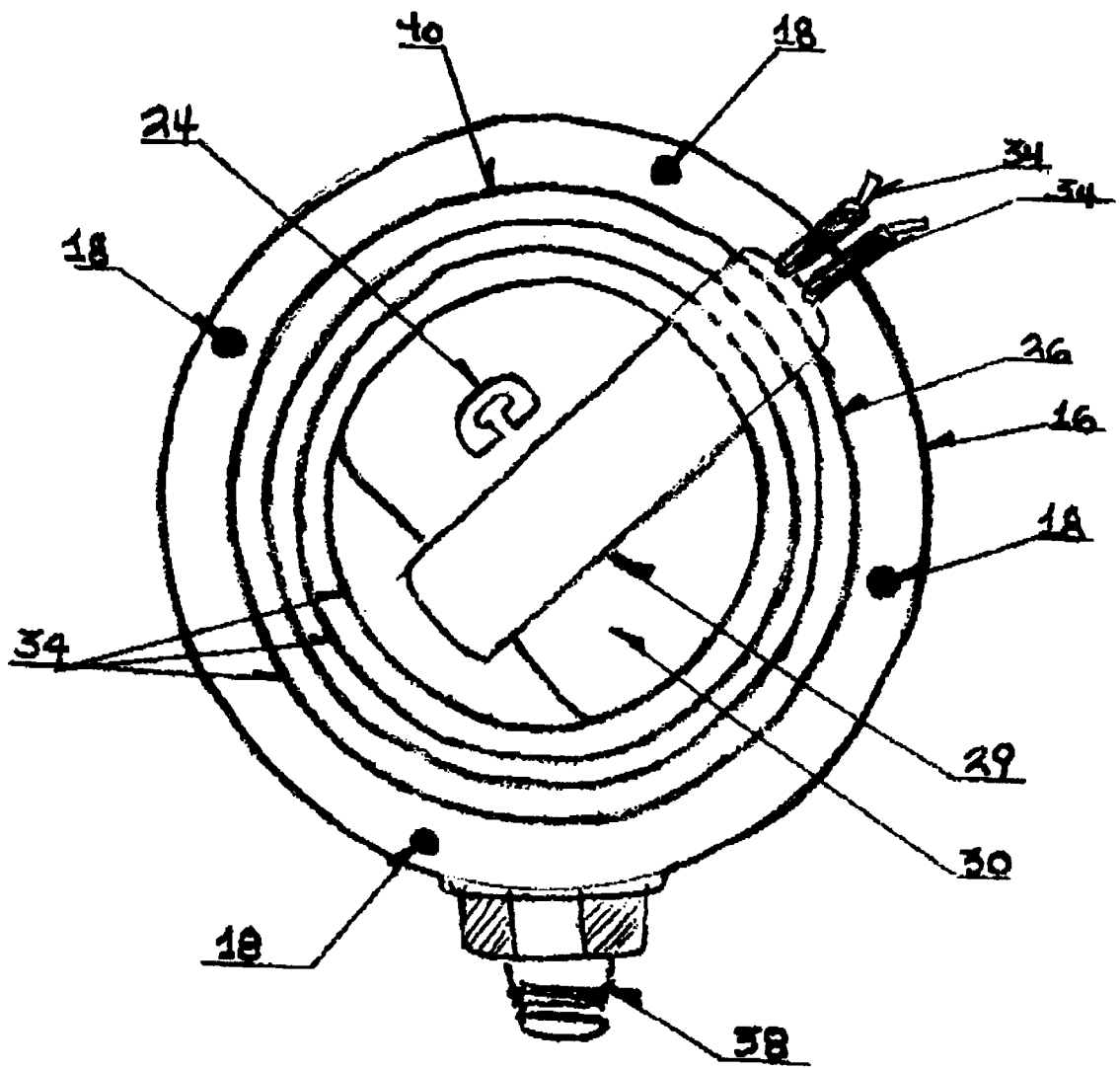
FIG. 3 is a top view of the filter with the top removed.

The purifier 10 includes a housing 12 having a rounded bottom 11 and a domed cover 14 with its widest diameter at a base 13 and decreasing in diameter up to a top portion 15. The apex 15 of the domed cover 14 defines a threaded aperture for receiving an elbow 17 which is connected to a conduit 19 for venting vapors that ascend the domed cover 14. The domed cover 14 is attached to a flange 16 (see FIG. 3) of the housing 12 by means of a plurality of screws 18. A gasket (not shown) is sandwiched between the housing 12 and the domed cover 14 to hermetically seal the housing 12 to the domed cover 14 of the purifier 10. An inlet connector 20 is provided in the housing 12 to allow oil to enter into an inlet duct 22 formed in the bottom of a evaporator 26. A regulator 24 (shown in the preferred embodiment as a flow screw) obstructing an aperture, which regulates the flow of oil through the inlet duct 22 into the heating chamber 30. The evaporator 26 contains a cascading outer surface 28. The heating chamber 30 of the evaporator 26 has an exposed horizontal heating wand 29. The evaporator 26 includes a cup which holds both the exposed, horizontal heating wand 29 and oil. The cascading outer surface 28 is made up of a plurality of ridges 32 that are formed by increasing the outer diameter of the cup from top to bottom. Wires 34 extend into one end of the horizontal heating wand 29. The housing 12 defines an aperture fitted with a rubber bushing (not shown) into which the wires 34 are inserted and sealed. The outlet chamber 36 is located within the interior lower portion of the housing 12 and releases oil through an oil discharge connector 38.

In operation, the exposed horizontal heating wand 29 is heated by means of a resistor 31 which is inserted into the heating wand 29. Oil flows into the heating chamber 30 from the inlet chamber 22 via the flow regulator 24 and engulfs the exposed horizontal heating wand 29, resulting in the heating of oil to a temperature between 195 and 205 degrees F. Heated oil fills the heating chamber 30 and flows over the top lip 40, cascading over the plurality of ridges on the exterior of the cascading evaporator 28, thus impeding the flow of oil and promoting the evaporation of impurities. Vaporized impurities rise upwards along the interior of the domed cover 14 through a conduit 19 and out of the purifier 10. Purified oil flows into the bottom of the outlet chamber 36 and out of the purifier 10 through an oil discharge connector 38.

The present invention also relates to a method of treating oil to remove volatile impurities. In the first step of the method, a purifier is provided. The purifier includes a housing with both an inlet and outlet for the passage of oil. Further included is an evaporator and chamber for use in heating oil and evaporating impurities. The evaporator includes an outer surface over which heated oil can be cascaded. Finally, the purifier includes a vented dome into which impurities are evaporated.

In the second step, oil is introduced into the evaporator by way of the upper inlet. Thereafter, the oil is collected in the chamber and heated sufficiently to evaporate any volatile impurities. The fourth step involves allowing the heated oil to cascade over the outer surface of the evaporator. Such step further increases the rate by which volatile impurities are evaporated. In the fifth step, evaporated impurities are vented into the dome of the evaporator. Finally, the oil from which volatile impurities have been evaporated is allowed to exit the purifier through the outlet duct.

What is claimed is:

1. An oil purification device comprising:

a housing, a domed cover covering said housing, an evaporator system having a bottom portion, the evaporator system located within said covered housing for vaporizing impurities in oil to be treated;

said housing defining an upper inlet for the introduction of oil to be treated and a lower outlet for delivering treated oil out of the purifier;

said domed cover forming an apex defining an aperture for receiving a conduit to allow for the flow of volatile evaporated impurities outside the purifier; and said evaporator system positioned within said housing above said lower outlet, said evaporator system having an inlet duct formed at its bottom and fluidly connected to said upper inlet, said evaporator system including a heating chamber providing a means for containing oil to be heated, the chamber having an outer diameter that increases from a top portion to a bottom portion of the chamber, a heating wand for generating heat by electrical resistance located within the heating chambers the heating wand being engulfed by oil contained within the chamber for the evaporation of impurities, a regulator for controlling oil flow into said heating chamber, and an outer surface, said outer surface being cascaded from top to bottom so that when oil is continuously introduced into said heating chamber it cascades around said outer surface of said evaporator system for increased evaporation of impurities purified oil thereafter flowing downwardly to the lower outlet.

2. A method of treating oil to remove volatile impurities comprising the following steps:

a) providing an oil purification device, the device comprising inlet and outlet passages, an evaporator and reservoir for use in heating oil located above the outlet, the evaporator having an outer surface over which heated oil can be cascaded, the reservoir having an outer diameter that increases from a top portion to a bottom portion of the reservoir, the device also having a vented dome into which impurities can be evaporated;

b) introducing oil through the upper inlet and into the evaporator c) heating oil in the reservoir sufficient to evaporate volatile impurities;

d) cascading the heated oil over the outer surface of the evaporator to further increase the rate of evaporation of volatile impurities;

e) venting impurities evaporated by the evaporator to the vented dome;

f) draining the oil from which the volatile impurities have been evaporated from the purifier through an outlet duct located at the bottom of the purifier.

3. The method as defined in claim 2 wherein oil is heated in the reservoir to a temperature between 195 and 205 degrees Fahrenheit.

4. A filterless oil purification device comprising:

a housing having a bottom extent and an upper top portion which is closed by a domed cover, the domed cover having an aperture at its apex, the housing further including an upper oil inlet and a lower oil discharge;

an evaporator positioned within the housing above the discharge, the evaporator having an internal cup defined by a lip interconnected with the oil inlet, the evaporator also including an external cascaded surface formed from a plurality of ridges, the ridges increasing the outer diameter of the cup from top to bottom;

a heating wand positioned within the cup, the wand being engulfed by oil positioned within the cup such that the oil is heated and impurities are evaporated, evaporated impurities being evacuated from the housing by way of the aperture, the external surface functioning such that the continual supply of oil through the inlet causes oil to flow over the lip of the cup and onto the external surface where increased evaporation of impurities takes place, these impurities also being evacuated by way of the aperture, after passage over the external surface, the oil exiting the housing by way of the lower discharge.

5. The device as described in claim 4 wherein the flow of oil from the inlet and into the cup is governed by a regulator whereby the flow of oil into the cup is controlled.

6. The device as described in claim 4 wherein the wand generates heat by way of electrical resistance.

* * * * *